(12) United States Patent
Perry

(10) Patent No.: US 7,784,876 B2
(45) Date of Patent: Aug. 31, 2010

(54) MOTORCYCLE WHEEL ASSEMBLY AND METHOD FOR PROTECTING BEARINGS AND FOR PROVIDING SECURITY FOR MOUNTING BOLTS

(76) Inventor: David C. Perry, 321 Snapper Dr., Destin, FL (US) 32541

( * ) Notice: Subject to any disclaimer, the term of this patent is extended or adjusted under 35 U.S.C. 154(b) by 159 days.

(21) Appl. No.: 12/157,949

(22) Filed: Jun. 16, 2008

(65) Prior Publication Data

US 2009/0309411 A1    Dec. 17, 2009

(51) Int. Cl.
*B62L 1/00*    (2006.01)
*B60B 7/00*    (2006.01)

(52) U.S. Cl. .................. 301/6.9; 301/6.8; 301/37.102; 188/218 XL; 188/26

(58) Field of Classification Search .............. 301/6.1, 301/6.8, 6.9, 6.91, 37.101, 37.102, 37.371, 301/110.5, 108.1; 188/218 A, 218 XL, 26
See application file for complete search history.

(56) References Cited

U.S. PATENT DOCUMENTS

| | | | |
|---|---|---|---|
| 3,722,958 A | 3/1973 | Marshall | |
| 3,763,674 A | 10/1973 | Zahner | |
| 4,170,369 A * | 10/1979 | Strutman | 280/261 |
| 4,456,099 A * | 6/1984 | Kawaguchi | 188/71.6 |
| 4,550,809 A * | 11/1985 | Kawaguchi | 188/18 A |
| 4,967,867 A | 11/1990 | Fuller | |
| 5,290,094 A | 3/1994 | Gragg | |
| 5,588,715 A | 12/1996 | Harlen | |
| 5,823,555 A * | 10/1998 | Ashman | 280/279 |
| 5,881,835 A | 3/1999 | Lucht et al. | |
| 6,565,243 B1 | 5/2003 | Cheung | |
| 6,776,459 B2 | 8/2004 | Fitzgerald | |
| D567,166 S * | 4/2008 | Bogani | D12/209 |
| 2006/0219488 A1 * | 10/2006 | Chen | 188/26 |

FOREIGN PATENT DOCUMENTS

| | | | | |
|---|---|---|---|---|
| JP | 60067245 | A * | 4/1985 | |
| JP | 4244491 | A * | 9/1992 | |
| JP | 09071285 | A * | 3/1997 | |

* cited by examiner

*Primary Examiner*—S. Joseph Morano
*Assistant Examiner*—Kip T Kotter
(74) *Attorney, Agent, or Firm*—Arthur G. Yeager

(57) ABSTRACT

A motorcycle wheel assembly having a wheel with a central hub and an axle extending centrally through the hub with interior wheel bearings and at least one brake disc in abutment with the outside surface of the hub is provided with at least a wheel cover fitted onto a spacer surrounding the axle between the brake disc and the lower extremity of an adjacent fork in order to protect the wheel bearings and the mounting bolts from sand and grit. The wheel cover includes a shoulder portion on one side through which a spacer and an axle extend and an outer lip overlying the brake disc and mounting bolts.

18 Claims, 5 Drawing Sheets

MOTORCYCLE WHEEL ASSEMBLY AND METHOD FOR PROTECTING BEARINGS AND FOR PROVIDING SECURITY FOR MOUNTING BOLTS

CROSS-REFERENCE TO RELATED APPLICATION

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

The present invention relates to motorcycle wheel assemblies that are designed to protect bearings and provide security for mounting bolts.

2. Relevant Art

A variety of motorcycle wheel assemblies exist for enhancing the appearance of the wheel; however, a rider's enjoyment will often come more from the performance of his machine than from merely its appearance. During the course of a ride, a motorcycle can encounter a multitude of terrains and an array of weather conditions. Also a consideration is the rider's safety, as well as the security of the motorcycle. What is needed, therefore, is a motorcycle wheel assembly that protects the front wheel bearings and mounting bolts while also securing the mounting bolts from vandalism and theft.

BRIEF SUMMARY OF THE INVENTION

A preferred form of a motorcycle wheel assembly in accordance with the present invention comprises a wheel, an axle, wheel bearings, a pair of brake discs, mounting bolts, a pair of spaced forks and a pair of wheel covers for protecting the wheel bearings and mounting bolts, and providing security for the mounting bolts. The wheel has a central hub with opposing outside surfaces. The axle extends centrally through the hub, with wheel bearings located between the axle and hub so as to permit the wheel to rotate freely. Each of the two brake discs abut a corresponding outside surface of the hub with the mounting bolts securing each brake disc to its corresponding outside hub surface. Each of the two forks has an opening at its lower extremity for receiving one end of the axle, with the wheel, hub, wheel bearings and brake discs all positioned between the extremities of the two forks. This invention provides a single wheel cover or a pair of wheel covers, with each wheel cover fitted onto the axle between a corresponding brake disc and a corresponding fork, so as to be positioned in close proximity to the brake disc. Each wheel cover is then secured in place along the axle utilizing a spacer extending through the wheel cover. In this way, the wheel cover offers protection to the adjacent wheel bearings and mounting bolts, while also providing security for the mounting bolts.

The wheel cover could be fabricated from a metal or plastic. If fabricated from metal, the wheel cover may be machined from one piece of material or fashioned from more than one piece. If created from plastic, similarly the wheel cover can be molded from one piece of material.

In one aspect of the present invention there is provided a motorcycle wheel cover for protecting the front wheel bearings in order to prevent and/or reduce costly repairs. The introduction of dirt and grime into the wheel bearings can result in damage not only to the bearings, but also to the hub and axle. Repairs can be relatively expensive, particularly if the wheel's hub or axle is scored due to faulty wheel bearings. Preventing the introduction of dirt and grime into the wheel bearings can extend the life of the bearings, thus deferring the cost of repairs.

In another aspect of the present invention there is provided a motorcycle wheel cover for enhancing a rider's safety. Front wheel bearings are critical to the steering and handling of a motorcycle. In helping to protect the front wheel bearings from the dirt and grime of the road, the wheel cover protects the rider from potential accidents due to faulty steering and handling. In addition, the motorcycle wheel cover offers protection from tampering. The wheel cover securely covers the mounting bolts so as to prevent vandals from gaining access to loosen or remove them.

In another aspect of the present invention there is provided a motorcycle wheel cover for securing the front mounting bolts so as to prevent theft. The wheel cover securely covers the mounting bolts so as to prevent thieves from gaining access to them.

In another aspect of the present invention there is provided a motorcycle wheel cover for alleviating the toil of cleaning the mounting bolts and the nooks and crannies around the mounting bolts where dirt tends to collect and where cleaning can be difficult.

In another aspect of the present invention there is provided a motorcycle wheel cover for enhancing the appearance of the wheel by substantially overlying and covering the heads of the mounting bolts.

BRIEF DESCRIPTION OF THE SEVERAL VIEWS OF THE DRAWING

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

DETAILED DESCRIPTION OF THE INVENTION

While the present invention is described in connection with a wheel construction that employs a spoked wheel, an axle, interior wheel bearings, two outside spacers and a pair of disc brakes, it will be readily apparent to one of ordinary skill in the art that the present invention can be utilized with other wheel constructions as well. In particular, the present invention may find use with a front wheel assembly that encompasses the use of a solid wheel, or one that encompasses the use of a single disc brake, or one that encompasses the use of a braking system other than disc brakes, or one that encompasses some combination of the aforementioned, or even one that encompasses some other combination of elements.

Figure 1:
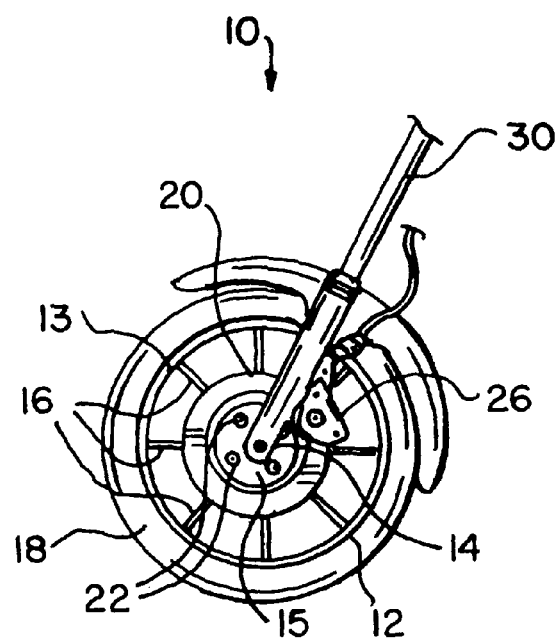
FIG. 1 is a side view of a prior art motorcycle front wheel assembly.
Figure 2:
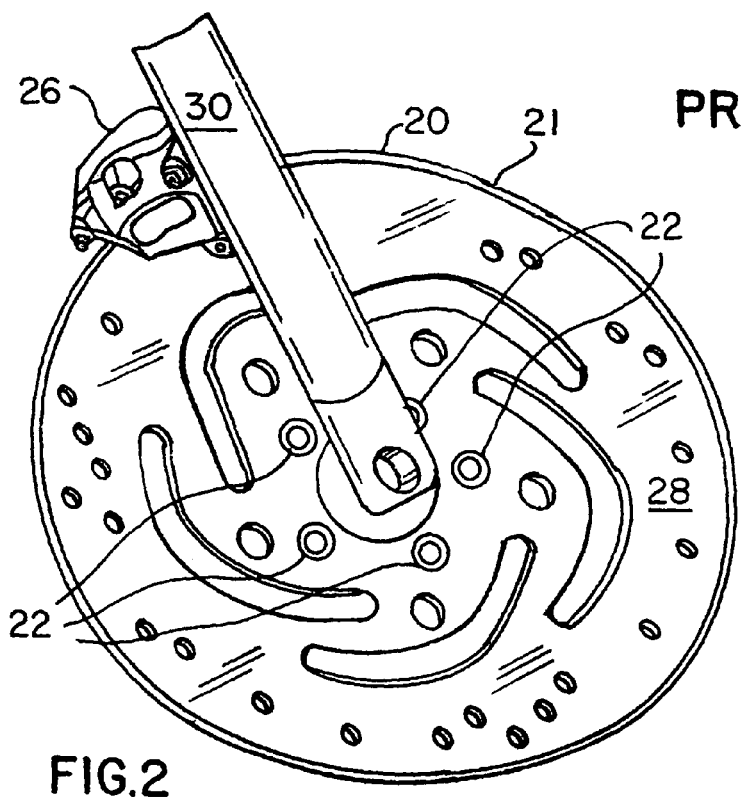
FIG. 2 is a side view of a prior art brake disc, caliper sub-assembly, and fork sub-assembly.
Figure 3:
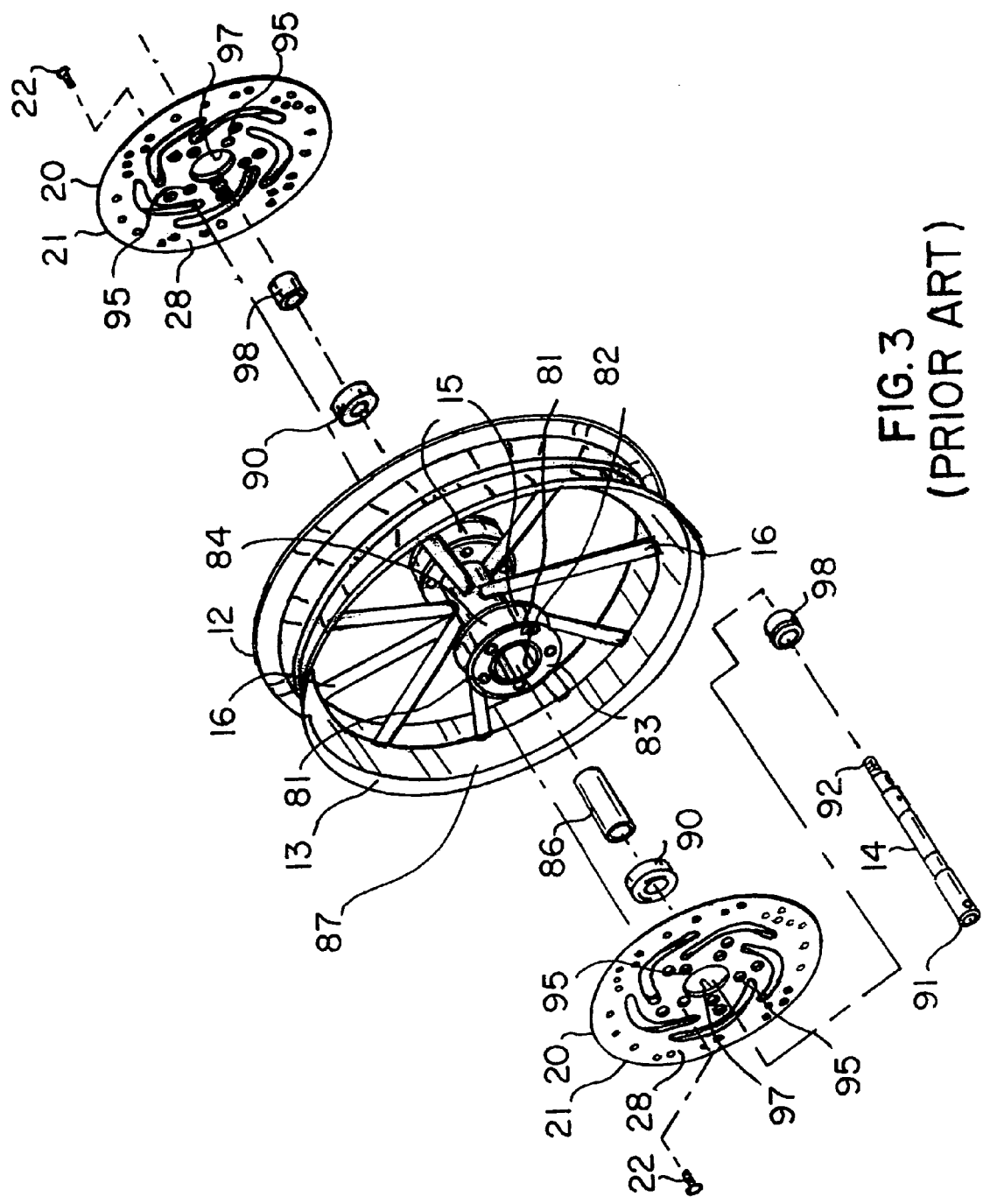
FIG. 3 is an exploded perspective of a prior art motorcycle front wheel assembly.

FIGS. 1-3 illustrate a prior art motorcycle front wheel assembly identified generally by numeral 10. The motorcycle front wheel assembly 10 comprises a wheel 12, an axle 14, a tire 18, brake discs 20, a plurality of mounting bolts 22, a brake caliper sub-assembly 26, and a fork sub-assembly 30. The wheel 12 also comprises a rim 13, a cylindrical hub 15 and a plurality of spaced spokes 16. The rim 13 extends around the circumference of the wheel 12 and has a bottom surface 87 for attaching one end of each spoke 16. The hub 15 resides at the center of the wheel 12 and comprises an axle hole 82 for receiving the axle 14, opposing outside surfaces 83, a plurality of fastener holes 81 for accepting fasteners such as mounting bolts 22 into the outside surfaces 83, and a top surface 84 for attaching one end of each spoke 16. The axle hole 82 of the hub 15 extends through the middle of the hub 15 and is axial with respect to the rim 13. The axle hole 82 of the hub 15 is of a sufficient diameter to receive the axle 14. The fastener holes 81 of the hub 15 are spaced about each outer surface 83 of the hub 15. One end of each spoke 16 is attached to the bottom surface 87 of the rim 13, while the opposite end of each spoke 16 is attached to the top surface 84 of the hub 15. The spokes 16 are spaced one from the other and oriented generally radially to the axle hole 82 of the hub 15. The axle 14 comprises an axle head 91 and an axle end 92. Each brake disc 20 comprises an axle hole 97 for receiving the axle 14, a plurality of fastener holes 95 for accepting the mounting bolts 22, an outer surface 28, and an edge 21. The axle hole 97 of the brake disc 20 extends through the middle of each brake disc 20 and is of a sufficient diameter to receive the axle 14. The fastener holes 95 are spaced about each outer surface 28 of the brake disc 20. The fork sub-assembly 30 comprises opposing forks 32, 33 (not shown separately in FIGS. 1-3, but see FIG. 5). Each fork 32, 33 comprises a lower portion 36 and an axle hole 38 for receiving the axle 14. The axle hole 38 of the forks 32, 33 extends through the lower portion 36 of each and is oriented generally laterally to the vertical direction of each fork 32, 33 and is of a sufficient diameter to receive the axle 14.

The tire 18, shown only in FIG. 1, is mounted on the rim 13 of the wheel 12 in the customary manner. A brake caliper sub-assembly 26, one of which is shown in FIGS. 1 and 2, is mounted on each fork 32, 33 and aligned over a corresponding brake disc 20 so as to allow the brake disc 20 to rotate freely within the brake caliper sub-assembly 26 when the brake is not engaged. Each brake disc 20 is secured to the wheel 12 by mounting bolts 22 that pass through the fastener holes 95 of each brake disc 20, and through the fastener holes 81 of the hub 15 to secure each brake disc 20 and the wheel 12 together. The left and right brake discs 20, the hub 15 and the left and right forks 32, 33 are axially aligned such that the axle 14 can be received therein.

In the specific prior art construction shown in FIGS. 1-3, the axle 14 passes through the axle hole 38 of one of the forks 32, 33 on one side of the wheel 12, through the axle hole 97 of a first brake disc 20, through the axle hole 82 of the hub 15, through the axle hole 97 of the other brake disc 20 on the opposite side of the wheel 12, and through the axle hole 38 of the other fork 32, 33. The axle head 91 is positioned adjacent to the lower portion 36 of one fork 32, 33, while the axle end 92 protrudes from the axle hole 38 of the other fork 32, 33. The axle end 92 is secured by a fastener, such as an axle nut 37. A center spacer 86 fits over the axle 14 and is completely housed within the axle hole 82 of the hub 15. On each of the left and right sides of the wheel 12, wheel bearings 90 fit over the axle 14 and are positioned within the axle hole 82 of the hub 15, adjacent to the center spacer 86. On each of the left and right sides of the wheel 12, an outside spacer 98 fits over the axle 14 outwardly with respect to the adjacent bearing 90. This configuration results in the lower portion 36 of each fork 32, 33 residing adjacent to the corresponding outside spacer 98.

In accordance with the present invention, there is provided a motorcycle wheel assembly and method for protecting the wheel bearings and providing security for the mounting bolts. A preferred embodiment of the present invention is shown in FIGS. 4-9, where the motorcycle wheel assembly comprises those prior art components described above with reference to FIGS. 1-3, or equivalents, and further comprises a wheel cover 100 having the features described below.

Figure 5:
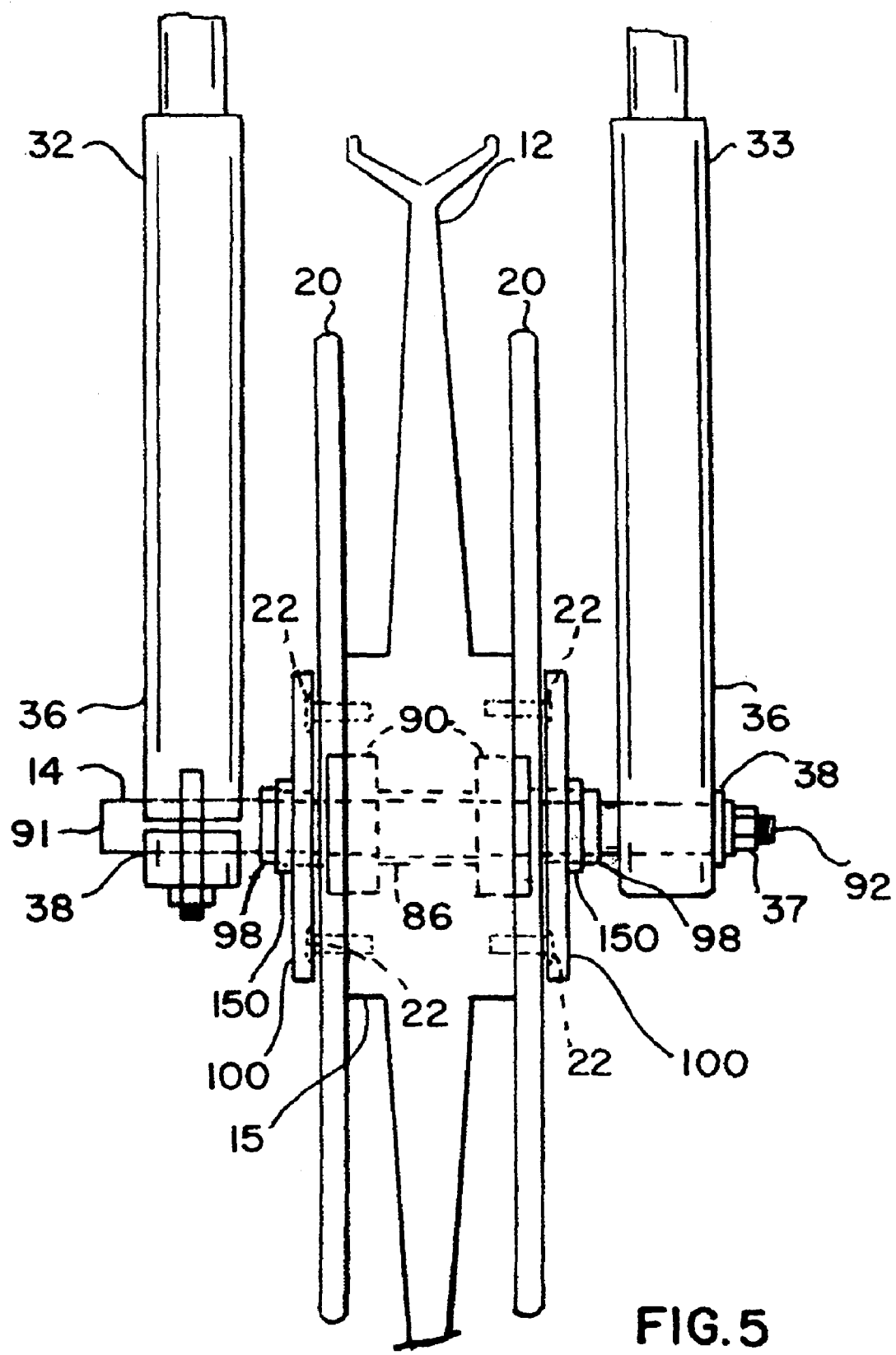
FIG. 5 is a front view of a motorcycle front wheel assembly in accordance with this invention.

As shown in FIGS. 4-9, the preferred embodiment of the cover 100 comprises a plate-like cover member 110 having an exterior surface 120, a central axle opening 160 and a flange or lip 130. The lip 130 extends around the circumference of the body cover 100 and is of a sufficient dimension so as to form a cavity 140 therein capable of covering the bearings 90 and mounting bolts 22. As seen in FIG. 5, the diameter of the cover 100 is generally equal to the diameter of the hub 15 since the mounting bolts 22 are threadedly connected to the hub 15 and are located within the circumference of the hub 15, resulting in each wheel cover 100 leaving an outer portion of the brake disc 20 uncovered to avoid interference with the operation of the brake caliper 26. The brake caliper 26 is spaced radially outward of the mounting bolts 22.

As seen in FIG. 5, the cover member 110 has a radial dimension less than that of the brake discs 20, leaving an outer portion of the brake discs 20 uncovered by the cover member 110 so as to avoid any interference with braking between a brake caliper sub-assembly 26 shown in FIGS. 1 and 2, and not shown in FIG. 5. Also, the cover 100 and cover member 110 only include a single axle opening 156 passing through the exterior surface 120.

Figure 8:
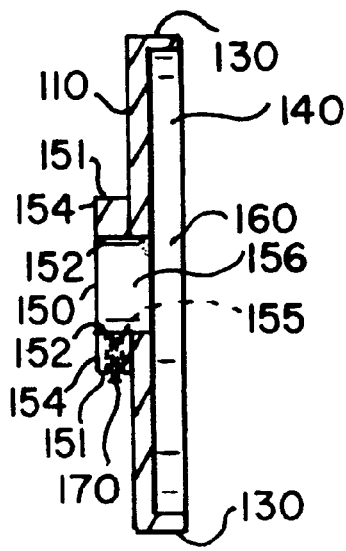
FIG. 8 is a cross-sectional view of the preferred embodiment of the motorcycle wheel cover along line 8-8 in FIG. 7.
Figure 7:
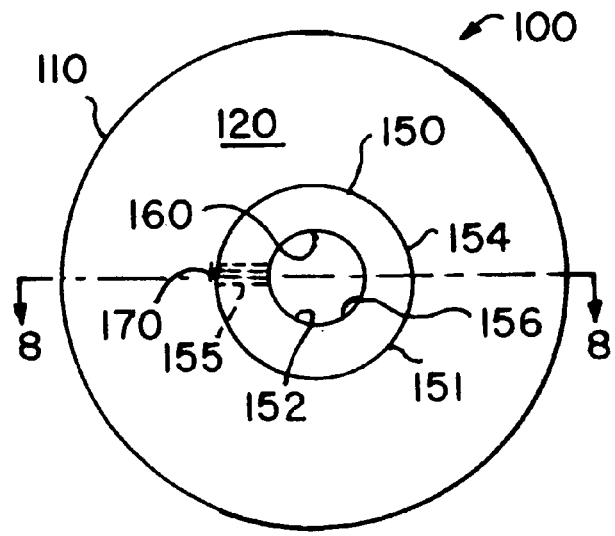
FIG. 7 is a front view of a preferred embodiment of the motorcycle wheel cover shown in FIGS. 5 and 6.
Figure 9:
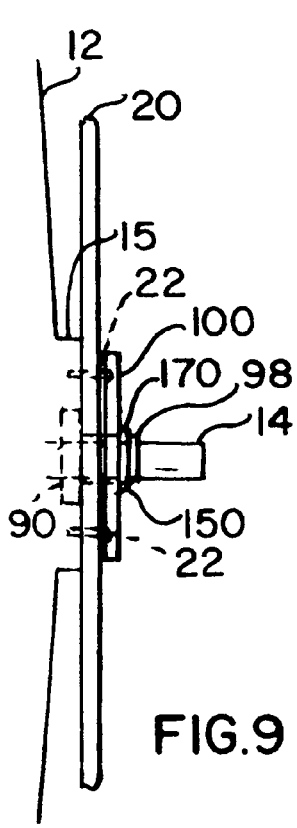
FIG. 9 is a partial front view of the motorcycle front wheel assembly of FIG. 5.
Figure 4:
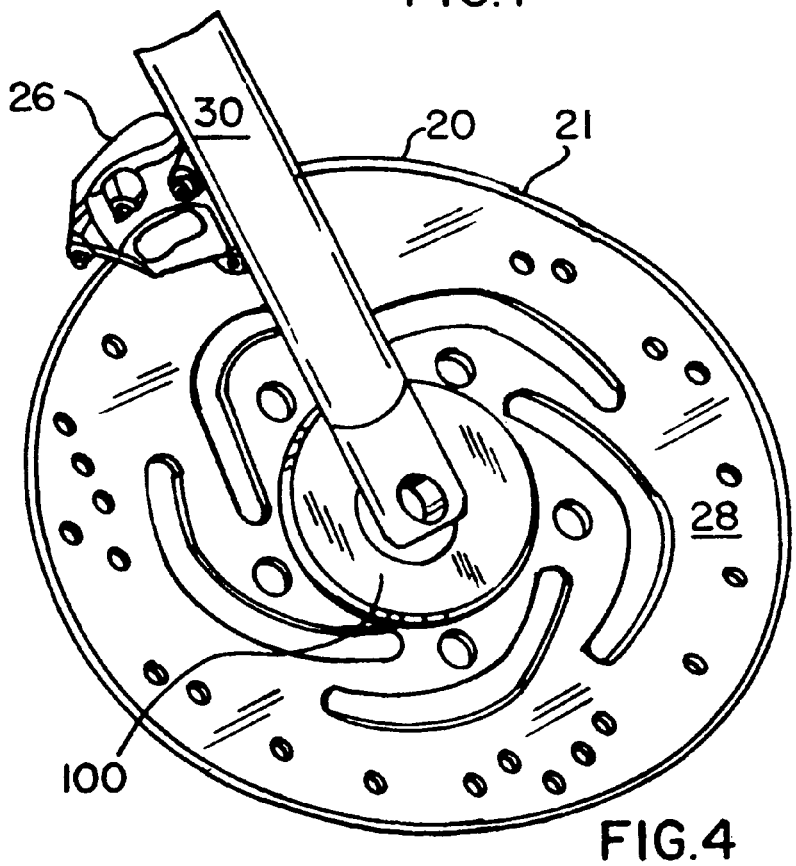
FIG. 4 is a side view of the brake disc, caliper sub-assembly, and fork sub-assembly shown in FIG. 2, along with a wheel cover in accordance with the present invention.

Referring now to FIGS. 7 and 8, the cover member 110 also comprises a shoulder 150 of smaller circumference than the cover member 110, with the shoulder 150 extending generally outwardly from the exterior surface 120. The shoulder 150 comprises a generally cylindrical wall 154 and a centrally-located axle opening 156 that is defined by the circumference of the wall 154. The resulting wall 154 is of a sufficient width along at least one portion of its length so as to receive a set screw 170. The axle opening 156 of the shoulder 150 is axially aligned with the axle opening 160 of the exterior surface 120 of the cover 100 such that the axle 14, with the bearings 90 and spacers 86, 98 installed thereon, passes through both the shoulder 150 and the cover member 110. The wall 154 comprises an exterior surface 151, an interior surface 152 and at least one cavity 155. The cavity 155 extends laterally through both the exterior 151 and interior surfaces 152 of the wall 154 at a point in the wall 154 where the width of the wall 154 is of a sufficient depth to house the set screw 170. The cavity 155 is of a sufficient dimension to receive the set screw 170. The set screw 170 engages the spacer 98, thereby securing the wheel cover 100 in a fixed manner.

Each cover member 110 has an outer periphery in closer proximity to an adjacent surface of a brake disc 20 when installed on the spacer 98 than an area of the cover member 110 at the central shoulder 150 at the single axle opening 156.

Each wheel cover 100 is positioned between the adjacent fork 32, 33 and the adjacent brake disc 20, such that the cavity 140 of the cover 100 fits over the mounting bolts 22 and the adjacent bearings 90, and the spacer 98 extends through the axle hole 160 of the exterior surface 120 of the cover 100 and into the axle hole 156 of the shoulder 150. Each wheel cover 100 fits in close proximity to the adjacent brake disc 20 so as to significantly reduce the amount of dirt and debris entering the bearings 90. Since the wheel covers 100 do not engage the brake discs 20, the wheel covers 100 are prevented from rotating with the brake discs (see FIGS. 5 and 9).

Figure 6:
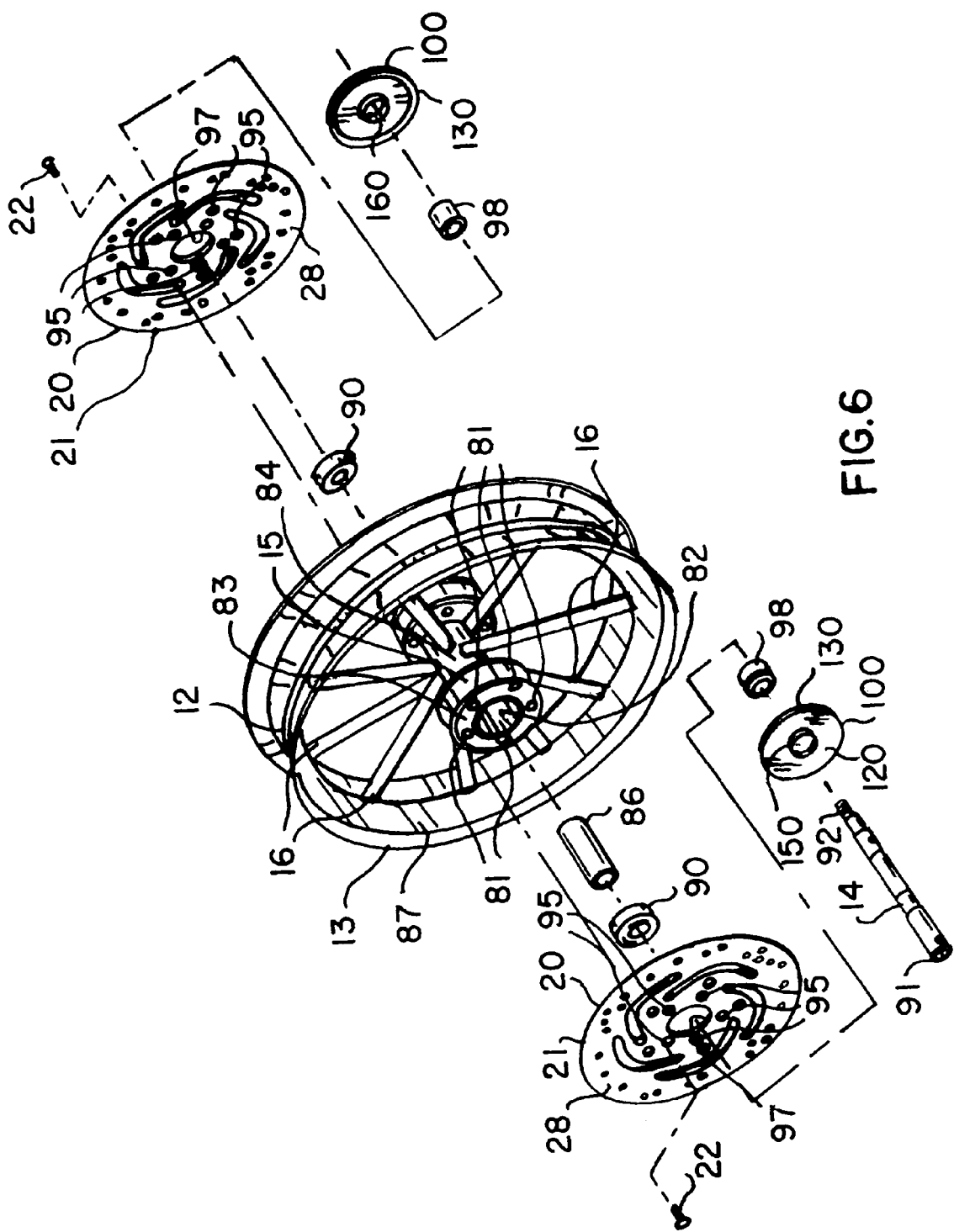
FIG. 6 is an exploded perspective of the motorcycle front wheel assembly of FIG. 5.

The wheel cover 100 can be employed on at least one side of a motorcycle, but preferably is employed on both sides, as shown in FIGS. 5 and 6. The wheel cover 100 also can be employed adjacent to the outer surface 83 of the hub 15 in those configurations where there is no adjacent brake disc 20. In such case, the wheel cover 100 fits in close proximity to the adjacent outer surface 83 of the hub 15 so as to significantly reduce the amount of dirt and debris entering the bearings 90. Since the wheel cover 100 does not engage the hub 15, the wheel cover 100 is prevented from rotating with the hub 15.

The wheel cover 100, for which a preferred embodiment is shown in FIGS. 7 and 8, may take other shapes that achieve the features of being spaced from the adjacent brake disc 20 while creating an intervening cavity. In those configurations where there is no adjacent brake disc 20, the wheel cover 100 may take other shapes that achieve the features of being spaced from the adjacent outer surface 83 of the hub 15 while creating an intervening cavity 140.

While the invention has been described with respect to certain specific embodiments, it will be appreciated that many modifications and changes may be made without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A motorcycle wheel assembly comprising a wheel having a central hub with an outside hub surface, a fixed axle extending centrally through said hub with interior wheel bearings between said axle and said hub to permit said wheel to freely rotate, a brake disc in abutment with said outside surface of said hub, a plurality of spaced mounting bolts located adjacent to said axle and securing said brake disc to said outside hub surface, a pair of spaced forks each having a lower extremity thereof for supporting a corresponding end of said axle with said wheel and said hub and said brake disc positioned between said extremities of said pair of forks, a brake caliper cooperating with said brake disc spaced radially outward of said mounting bolts, and a non-rotating wheel cover fitted onto said axle between said brake disc and one of said pair of forks and fitted in close proximity to said brake disc in order to protect said wheel bearings and provide security for said mounting bolts.

2. The motorcycle wheel assembly recited in claim 1 wherein said wheel cover comprises a cover member having a central opening for permitting the axle to extend therethrough.

3. The motorcycle wheel assembly recited in claim 2 wherein said cover member forms a cavity therein facing said brake disc for accommodating heads of said mounting bolts.

4. The motorcycle wheel assembly recited in claim 3 further comprising a non-rotating spacer surrounding said axle and fitted in said central opening of said cover member, said spacer being located between said brake disc and said lower extremity of said one fork, and a fastener for locking said cover member to said spacer.

5. The motorcycle wheel assembly recited in claim 4 wherein said cover member comprises a centrally disposed shoulder extending generally orthogonally from an outside surface of said cover member toward said lower extremity of said one fork.

6. The motorcycle wheel assembly recited in claim 5 wherein said fastener is a set screw that extends through said shoulder and into locking engagement with said spacer.

7. The motorcycle wheel assembly recited in claim 6 wherein said set screw extends through said shoulder radially with respect to said axle.

8. The motorcycle wheel assembly recited in claim 3 wherein said cover member has a radial dimension less than that of said brake disc and spaced away from said brake caliper, leaving an outer portion of said brake disc uncovered so that said cover member avoids any interference with braking provided by said brake caliper and said brake disc.

9. The motorcycle wheel assembly recited in claim 8 wherein said cover member has an outer periphery in closer proximity to an adjacent surface of said brake disc than an area of said cover member at said central opening.

10. The motorcycle wheel assembly recited in claim 1 wherein said hub comprises a second outside surface facing another said fork, another brake disc, another brake caliper and another wheel cover positioned between said second outside surface of said hub and said another fork.

11. The motorcycle wheel assembly recited in claim 1, wherein said wheel cover has a diameter generally equal to that of said outside hub surface.

12. The motorcycle wheel assembly recited in claim 1 wherein said cover member has a radial dimension generally equal to that of said hub and less than that of said adjacent brake disc, so as to leave an outer portion of said brake disc uncovered in order to avoid interference with braking.

13. A cover for protecting wheel bearings and providing security for mounting bolts of a motorcycle wheel comprising a cover member with a centrally-located axle opening for receiving a motorcycle axle having bearings and one spacer installed within said axle opening, said cover member having a circumference of a sufficient dimension so as to form a cavity along a side of the wheel for covering the bearings and the heads of the mounting bolts, wherein a brake caliper of the motorcycle wheel is spaced radially outward of said mounting bolts, said cover member being dimensioned to be disposed inwardly of an adjacent fork supporting the axle and outwardly of and closely spaced to the wheel and for inhibiting dirt and debris from entering the bearings and protecting the heads of the mounting bolts.

14. The cover as recited in claim 13, wherein said cover member further comprises a generally cylindrical shoulder having a smaller diameter than said cover member, said shoulder extending generally orthogonally from an exterior surface of said cover member and having a centrally-located axle opening aligned with said axle opening of said cover member such that said axle and said one spacer thereon passes through said openings of both said shoulder and said cover member, and a fastener extending radially through said shoulder of said cover for engaging said one spacer and locking said cover to said spacer.

15. The cover recited in claim 13 wherein said cover member has a radial dimension generally equal to that of a hub of said motorcycle wheel and less than that of an adjacent brake disc of said motorcycle wheel, so as to leave an outer portion of said brake disc uncovered in order to avoid interference with braking against said brake disc.

16. A method for protecting the front wheel bearings of a motorcycle wheel having a pair of forks with the hub of the wheel rotatably supported on a stationary axle extending through wheel bearings and with a brake disc adjacent to the wheel along one side of the hub, the method comprising the steps of fitting a non-rotatinq cover member onto a spacer on the axle between the brake disc and a lower extremity of one of the forks, in close proximity to the adjacent brake disc in order to protect and inhibit entry of dirt and debris into the wheel bearings, providing the cover member with a sufficient dimension to cover and provide security for mounting bolts extending through the brake disc and into the hub of the wheel, forming the cover member with a radial dimension generally equal to that of the hub and less than that of the adjacent brake disc, leaving an outer portion of the brake disc uncovered in order to avoid interference with braking against the brake disc, wherein a brake caliper of the motorcycle wheel is spaced radially outward of the mounting bolts.

17. The method recited in claim 16 further comprising the steps of providing a second cover member and filling the second cover member onto a second spacer on the axle between the second fork and an opposing side of the hub in order to protect and inhibit entry of dirt and debris into the wheel bearings on the opposing side.

18. The method recited in claim 16 further comprising the steps of fitting the cover member with a shoulder extending generally orthogonally from an exterior surface of the cover member, the shoulder having a smaller diameter than the cover member with a centrally-located axle opening in the shoulder aligned with the axle opening of the cover member, installing the spacer on the axle that fits within the opening of both the shoulder and the cover member, and locking the shoulder together with the spacer.

\* \* \* \* \*